Dec. 23, 1941. P. C. FLORENCE 2,267,454
CORN CUTTING AND SHOCKING MACHINE
Filed March 31, 1939 3 Sheets-Sheet 2
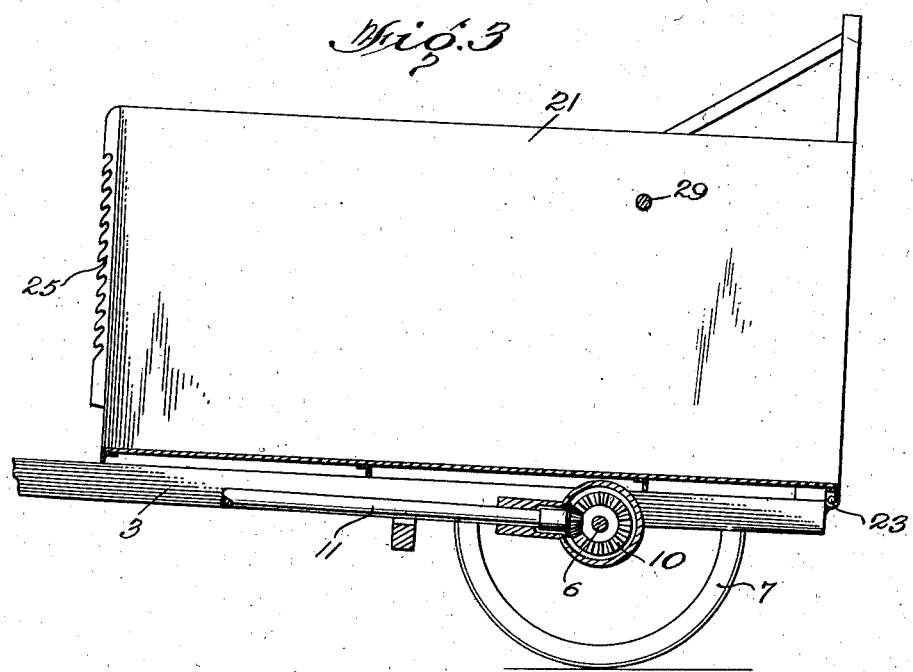
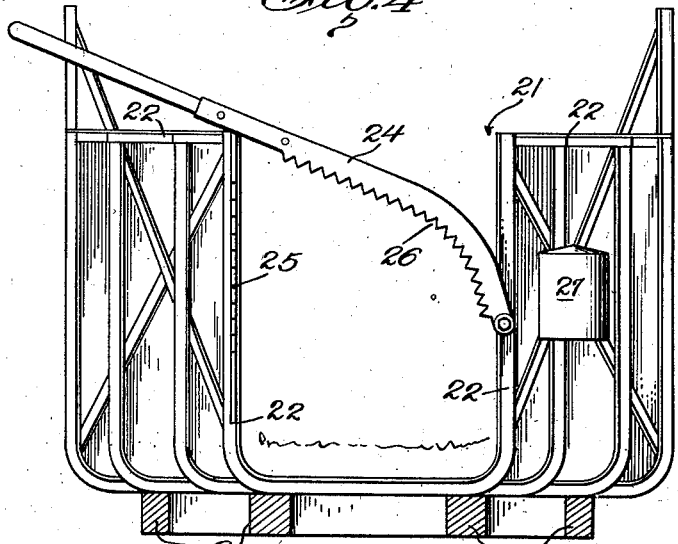
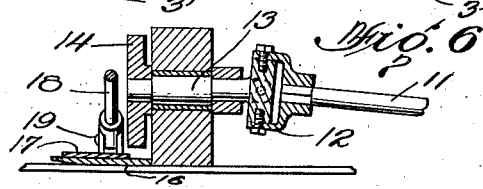
Inventor
Palmer C. Florence
H. S. McDowell
Attorney Dec. 23, 1941.   P. C. FLORENCE   2,267,454
CORN CUTTING AND SHOCKING MACHINE
Filed March 31, 1939   3 Sheets-Sheet 3
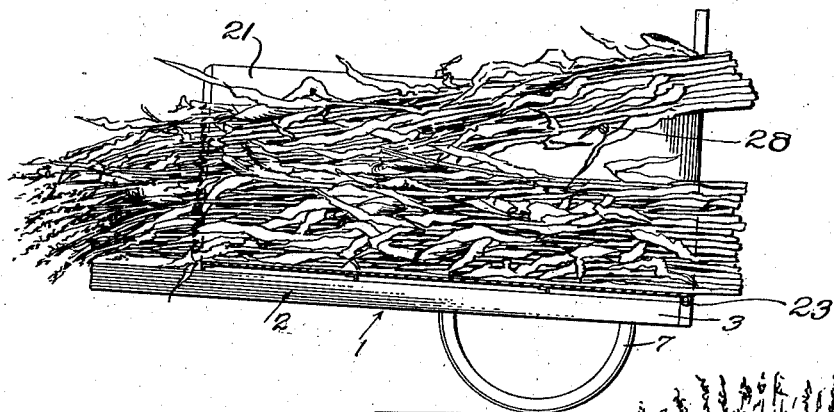
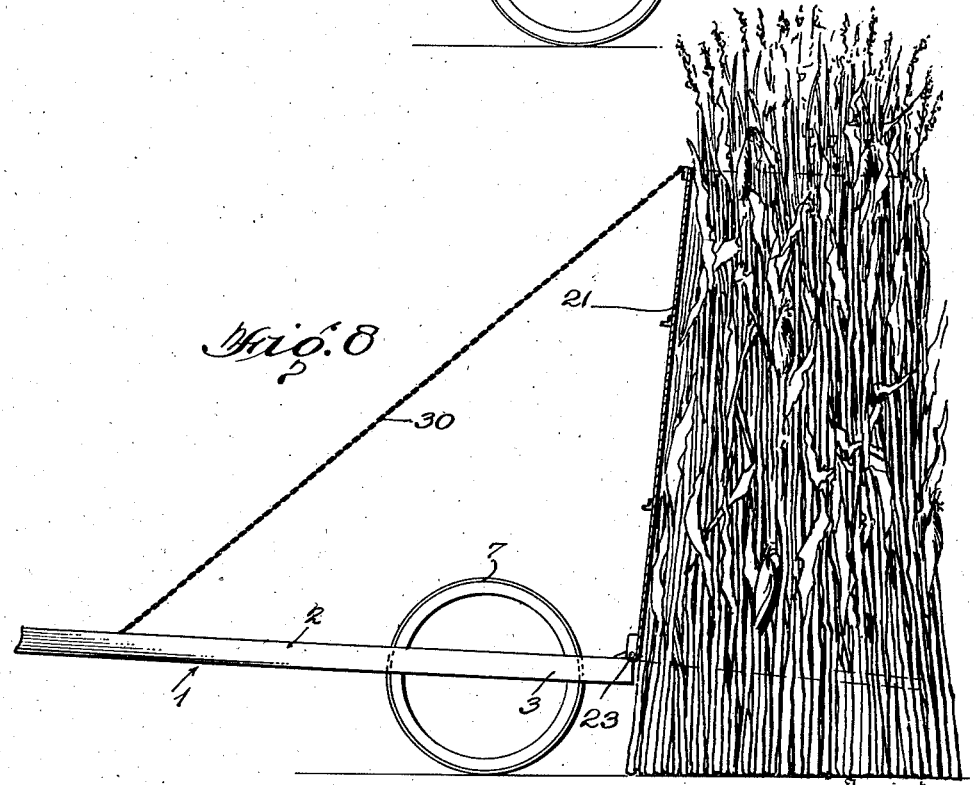
Inventor
Palmer C. Florence
By W. S. McDowell
Attorney Patented Dec. 23, 1941

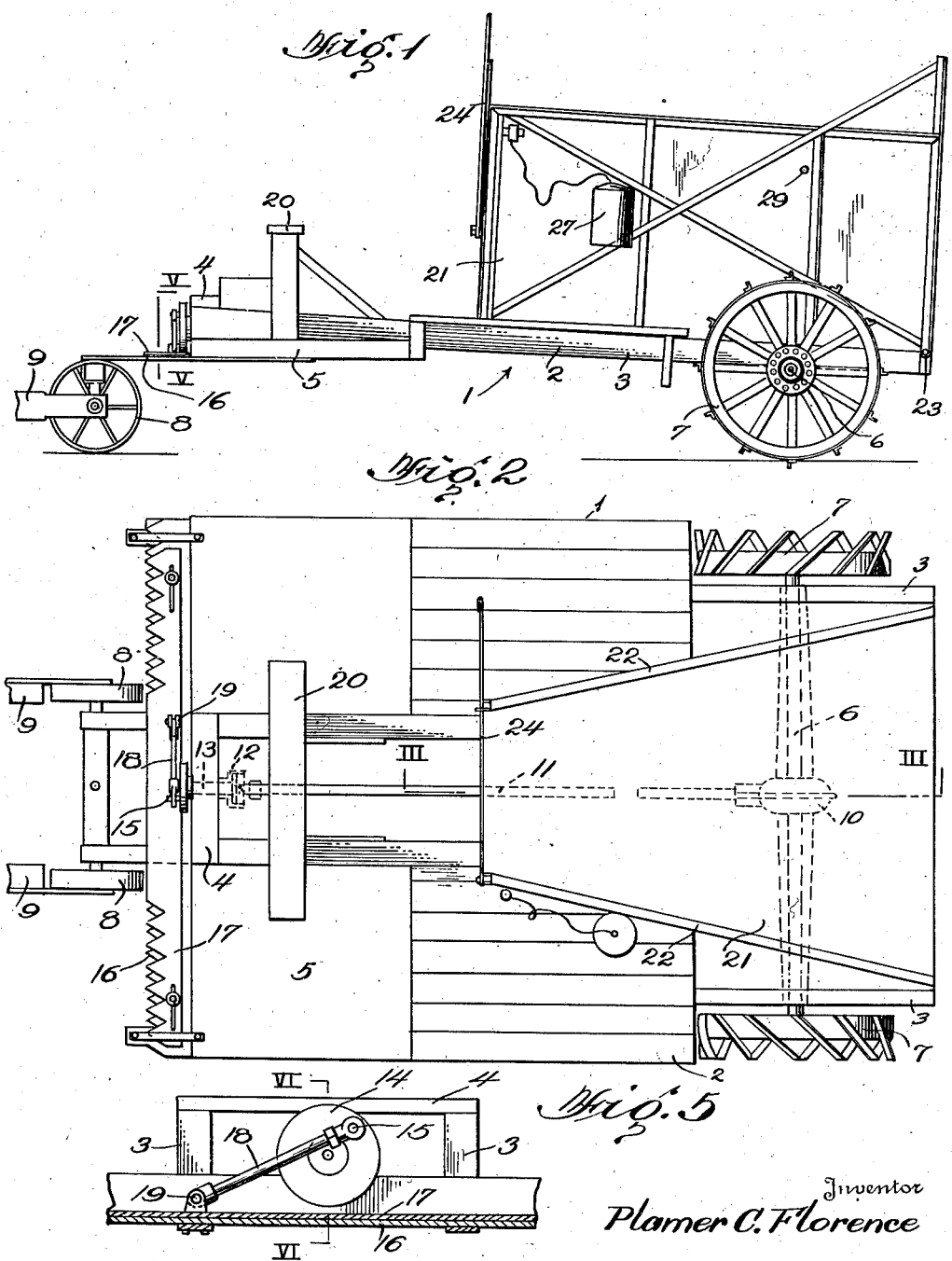

2,267,454

UNITED STATES PATENT OFFICE 2,267,454

CORN CUTTING AND SHOCKING MACHINE

Palmer C. Florence, Circleville, Ohio

Application March 31, 1939, Serial No. 265,351

2 Claims. (Cl. 56—83)

This invention relates generally to farm machinery and in its more particular aspects is directed to a combined corn cutting and shocking machine. The device is semiautomatic in operation and may be drawn either by horse or tractor. The primary object resides in the provision of a frame having ground engaging wheels and a cutting mechanism which is operated by power derived from the ground engaging wheels. The frame is provided with means for receiving the corn stalks and forming them into a shock. The shock forming means is tiltable to position the shock in vertical order upon the ground after it is formed.

Another object resides in providing the shock forming means with a member to apply compressive force to the upper end of the shock and to maintain the force while a tying element is placed around the upper end of the compressed shock.

Additional objects will be apparent from the following description and the accompanying drawings.

Fig. 1 is a side elevation of a combined corn cutting and shocking machine formed in accordance with the present invention;

Fig. 2 is a plan view of the machine shown in Fig. 1;

Fig. 3 is a vertical longitudinal sectional view taken through the machine on the plane indicated by the line III—III of Fig. 2;

Fig. 4 is a front elevation of the shock forming hopper;

Fig. 5 is a vertical transverse sectional view on the plane indicated by the line V—V of Fig. 1;

Fig. 6 is a detail vertical sectional view taken on the plane indicated by the line VI—VI of Fig. 5;

Fig. 7 is a longitudinal sectional view taken through the hopper during the formation of a shock;

Fig. 8 is a similar view showing the hopper in position to deposit the shock on the ground.

Referring more particularly to the drawings, the numeral 1 designates the machine in its entirety. This machine comprises a main frame 2 composed of longitudinally extending members 3 joined at their forward ends by transverse members 4. A supplemental frame 5 is provided at the forward end of the main frame and both frames have horizontal platforms upon which the operators stand. The main frame is provided at the rear portion with a transversely extending axle 6 to the ends of which are secured cleated ground engaging wheels 7. The forward end of the supplemental frame has a transverse steering frame pivotally fastened thereto and to the ends of which are secured the steering wheels 8. A pair of draft bars 9 are also secured to the ends of the steering frame. These members may be shafts between which a horse may be hitched or they may be draft bars for connection to a tractor.

The rear axle is formed at its central portion with differential gearing 10 which drives a longitudinally extending shaft 11 connected at its forward end by means of a universal connection 12 to a short shaft section 13 journaled in a transverse portion of the main frame. To the forward end of the shaft section 13, there is secured a flywheel having an eccentrically disposed crank extension 15. Below the flywheel, the supplemental frame has a transversely extending stationary serrated knife 16 upon which is slidably supported a similar movable knife section 17. These knife sections are serrated at their end portions to provide cutting mechanisms at either side of the machine. The V-shaped serrations on the knives are sharpened to provide cutting edges used in severing the stalks as the machine is driven thereagainst in the operation for which it is intended. At pitman 18 has one end connected to the crank 15 and the other end to a clevis 19 provided in connection with the movable knife section 17. As the machine is drawn over the ground, the rotation of the rear wheels will impart similar movement to the shaft 11 and the flywheel 14. The pitman will transfer this movement to the knife 17 and it will be moved back and forth relative to the stationary knife. Any material placed in the serrations in the knives will be severed by this relative movement between the sections.

An elevated seat 20 is provided adjacent the forward end of the frame upon which the operator sits when driving the machine. When corn is being cut, two operators stand on the platforms immediately back of the knives to catch the corn stalks. After collecting an armful, the operators place them in a horizontally disposed trough-shaped hopper 21 carried by the main frame. This member when viewed in plan is of truncated triangular configuration and is open at the top and both ends. It is formed of sheet metal and is reenforced around its edges by angle members 22. The lower edge of the rear end of the hopper is connected by hinges 23 to the rear edge of the main frame. At one side of the forward end, the hopper has a pivoted lever 24 which engages a serrated latch bar 25 carried by the opposite side of the hopper. The lever has its intermediate portion notched as at 26 to prevent the stalks from slipping when force is applied to the free end of the lever to compress the stalks prior to tying them with cord from a ball placed in a twine box 27 provided at one side of the hopper.

As illustrated in Fig. 7, when the shock is approximately one-half formed, a bar 28 is positioned in openings 29 in the hopper and extends transversely thereof to space the remaining stalks from those first placed in the hopper in order to make the base of the shock wider so that it will maintain its vertical position when placed on the ground. After a sufficient number of stalks have been placed in the hopper to form a shock, the lever 24 is operated to compress the upper ends of the stalks and when thus compressed, they are tied to maintain the shock in assembled condition. After the tying operation, the hopper with the shock therein is moved to a vertical position on its hinges as shown in Fig. 8. The lever 24 is then moved from engagement with the bar 25 and the shock placed on the ground at the rear of the machine. The hopper is then moved to its horizontal position ready to receive another shock. A chain 30 connecting the frame and the free end of the hopper prevents the latter from tipping completely over when moved to a vertical position.

From the foregoing, it will be seen that I have provided a machine for cutting and shocking corn which will permit two operators to quickly cut and shock a much larger quantity than is possible by hand. The machine is relatively inexpensive to manufacture. It is easy to operate and will require a minimum amount of care.

What I believe to be new and desire to secure by Letters Patent is set forth in the appended claims.

I claim:

1. In a corn cutting and shocking device of the type having a frame, power driven cutting mechanism thereon, and shock assembling means having a hopper pivotally supported on said frame for movement about a transversely extending axis, shock compressing means comprising a lever pivoted for swinging movement across the forward end of said hopper, serrations provided on one edge of said lever at the intermediate portion, and means provided adjacent the rear end of said hopper for holding the butt ends of the corn stalks placed therein in spaced relation.

2. In a corn cutting and shocking device of the type having a frame, power driven cutting mechanism thereon, shock assembling means comprising a body of truncated pyramidal form and having an open top and ends, said body having registering openings adjacent the larger end, stalk spreading means removably received by said registering openings, a lever pivotally supported by said body at a point disposed midway of the height of the smaller end, serrations formed on one edge of said lever at the portion adjacent the pivot for said lever, and means for holding said lever in different positions of adjustment.

PALMER C. FLORENCE.